United States Patent
Byers et al.

(10) Patent No.: US 9,455,787 B2
(45) Date of Patent: Sep. 27, 2016

(54) LIGHT EMITTING DIODE (LED)-BASED MULTI-BITRATE DATA LINKS

(71) Applicant: Cisco Technology, Inc., San Jose, CA (US)

(72) Inventors: Charles Calvin Byers, Wheaton, IL (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/525,619

(22) Filed: Oct. 28, 2014

(65) Prior Publication Data

US 2016/0119060 A1    Apr. 28, 2016

(51) Int. Cl.
| | |
|---|---|
| *H04B 10/116* | (2013.01) |
| *H04B 10/50* | (2013.01) |
| *H04B 10/114* | (2013.01) |
| *H04B 10/61* | (2013.01) |
| *H04B 10/27* | (2013.01) |
| *H04L 1/00* | (2006.01) |
| *H04J 14/02* | (2006.01) |

(52) U.S. Cl.
CPC .......... *H04B 10/502* (2013.01); *H04B 10/116* (2013.01); *H04B 10/1141* (2013.01); *H04B 10/27* (2013.01); *H04B 10/61* (2013.01); *H04J 14/02* (2013.01); *H04L 1/0002* (2013.01)

(58) Field of Classification Search
CPC ...... H04B 10/11–10/116; H04J 14/02–14/086
See application file for complete search history.

(56) References Cited

U.S. PATENT DOCUMENTS

| | | | | |
|---|---|---|---|---|
| 5,311,344 | A * | 5/1994 | Bohn ................. | H04B 10/2503 398/100 |
| 5,923,453 | A * | 7/1999 | Yoneyama ........... | H04B 10/077 398/167 |
| 6,151,336 | A * | 11/2000 | Cheng ...................... | H04J 3/22 370/535 |
| 6,226,296 | B1 * | 5/2001 | Lindsey ................ | H04J 3/1605 370/401 |
| 6,449,069 | B1 * | 9/2002 | Fujita .................. | H04J 14/0226 398/43 |
| 6,548,967 | B1 * | 4/2003 | Dowling ............ | G06Q 30/0201 315/307 |
| 6,822,975 | B1 * | 11/2004 | Antosik .................. | H04J 3/085 370/538 |
| 6,879,640 | B1 * | 4/2005 | Agazzi ............... | H04B 10/2575 375/295 |
| 7,689,130 | B2 * | 3/2010 | Ashdown ........... | H04B 10/1141 398/118 |

(Continued)

OTHER PUBLICATIONS

Byers et al., U.S. Appl. No. 14/031,853, filed Sep. 9, 2013.

(Continued)

*Primary Examiner* — Li Liu
(74) *Attorney, Agent, or Firm* — Leon R. Turkevich

(57) ABSTRACT

In one embodiment, a method comprises receiving, by an apparatus, first data at a first bitrate and second data at a second bitrate faster than the first bitrate; de-interleaving, by the apparatus, the first data into first de-interleaved data and the second data into second de-interleaved data; and controlling transmission of the first and second data in a single modulated light beam transmitted by a light emitting diode, the controlling including outputting portions of the first and second de-interleaved data to the light emitting diode, and controlling transmission of the light emitting diode.

22 Claims, 10 Drawing Sheets

(56) References Cited

U.S. PATENT DOCUMENTS

| | | | | |
|---|---|---|---|---|
| 7,912,376 | B2* | 3/2011 | Rollins | H04B 10/1141 398/118 |
| 7,949,259 | B2* | 5/2011 | Suzuki | H04B 10/116 398/172 |
| 8,009,985 | B1* | 8/2011 | Roberts | H04J 3/14 398/47 |
| 8,059,972 | B2* | 11/2011 | Yamada | H04B 10/1141 398/118 |
| 8,093,825 | B1* | 1/2012 | Van Ess | H05B 33/0818 315/291 |
| 8,195,054 | B2* | 6/2012 | Son | H04B 10/1141 398/158 |
| 8,433,203 | B2* | 4/2013 | Yokoi | H04B 10/116 398/118 |
| 8,744,273 | B2* | 6/2014 | Riedl | G08C 23/04 398/130 |
| 2005/0175358 | A1* | 8/2005 | Ilchenko | G02F 1/011 398/198 |
| 2005/0249505 | A1* | 11/2005 | Manderscheid | H04B 10/077 389/177 |
| 2008/0187317 | A1* | 8/2008 | Yamabana | H04J 3/0605 398/98 |
| 2008/0215391 | A1* | 9/2008 | Dowling | G06Q 30/0201 705/7.29 |
| 2012/0257901 | A1* | 10/2012 | Yamada | H04B 10/116 398/130 |
| 2013/0216221 | A1* | 8/2013 | Zhang | H04L 1/0057 398/43 |
| 2014/0186054 | A1* | 7/2014 | Teng | H04B 10/50 398/139 |
| 2015/0078333 | A1 | 3/2015 | Byers et al. | |

OTHER PUBLICATIONS

Thubert et al., U.S. Appl. No. 14/230,034, filed Mar. 31, 2014.
Byers et al., U.S. Appl. No. 14/481,234, filed Sep. 9, 2014.
Wetterwald et al., U.S. Appl. No. 14/155,474, filed Jan. 15, 2014.
Aliexpress, "100pcs WS2812B;4pin;5050 SMD RGB LED with built-in inside", [online], [retrieved on Oct. 21, 2014]. Retrieved from the Internet: <URL: http://www.aliexpress.com/store/product/100pcs-WS2812B-4pin-5050-SMD-RGB-LED-with-built-in-WS2811-IC-inside/701799_1202415085.html>, pp. 1-7.
Haas, "Wireless data from every light bulb", [online], Jul. 2011, [retrieved on Sep. 10, 2014]. Retrieved from the Internet: <URL: http://www.ted.com/talks/harald_haas_wireless_data_from_every_light_bulb>, pp. 1-6.
Slashdot, "800Mbps Wireless Network Made With LED Light Bulbs", [online], [retrieved on Sep. 4, 2014]. Retrieved from the Internet: <URL: http://science.slashdot.org/story/11/08/02/1322201/800mbps-wireless-network-made-with-led-light-bulbs?sdsrc=rel>, pp. 1-18.
Slashdot, "Intel Encodes Data in Flickering LEDs (and Shows Off Bright Ideas)", [online}, [retrieved on Sep. 4, 2014]. Retrieved from the Internet: <URL: http://developers.slashdot.org/story/12/09/11/1538222/intel-encodes-data-in-flickering-leds-and-shows-off-other-brightideas>, pp. 1-12.
PCPRO, "Intel shows off technologies of the future", [online], [retrieved on Sep. 4, 2014]. Retrieved from the Internet: <URL: http://www.pcpro.co.uk/blogs/2012/09/11/intel-shows-off-technologies-of-the-future/>, pp. 1-7.
"Scientists Use LED Light Bulbs to Make 800Mbps Capable Wireless Network", [online], [rerieved on Sep. 4, 2014]. Retrieved from the Internet: <URL: http://www.ispreview.co.uk/story/2011/08/02/scientists-use-led-light-bulbs-to-make-800mbps-capable-wireless-network.html>, pp. 1-3.
"Interlaken Protocol Definition, A Joint Specification of Cortina Systems and Cisco Systems, Revision: 1.1", [online], Jul. 25, 2006, [retrieved on Sep. 9, 2014]. Retrieved from the Internet: <URL: http://www.interlakenalliance.com/Interlaken_Protocol_Definition_v1.1.pdf>, pp. 1-55.

* cited by examiner

LIGHT EMITTING DIODE (LED)-BASED MULTI-BITRATE DATA LINKS

TECHNICAL FIELD

The present disclosure generally relates to control of a light emitting diode (LED) to emit a plurality of multi-bitrate data links.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

As the Internet of Everything (IoE) proliferates, billions of new devices will require wireless data connectivity to other devices, e.g., the Internet, home access networks, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
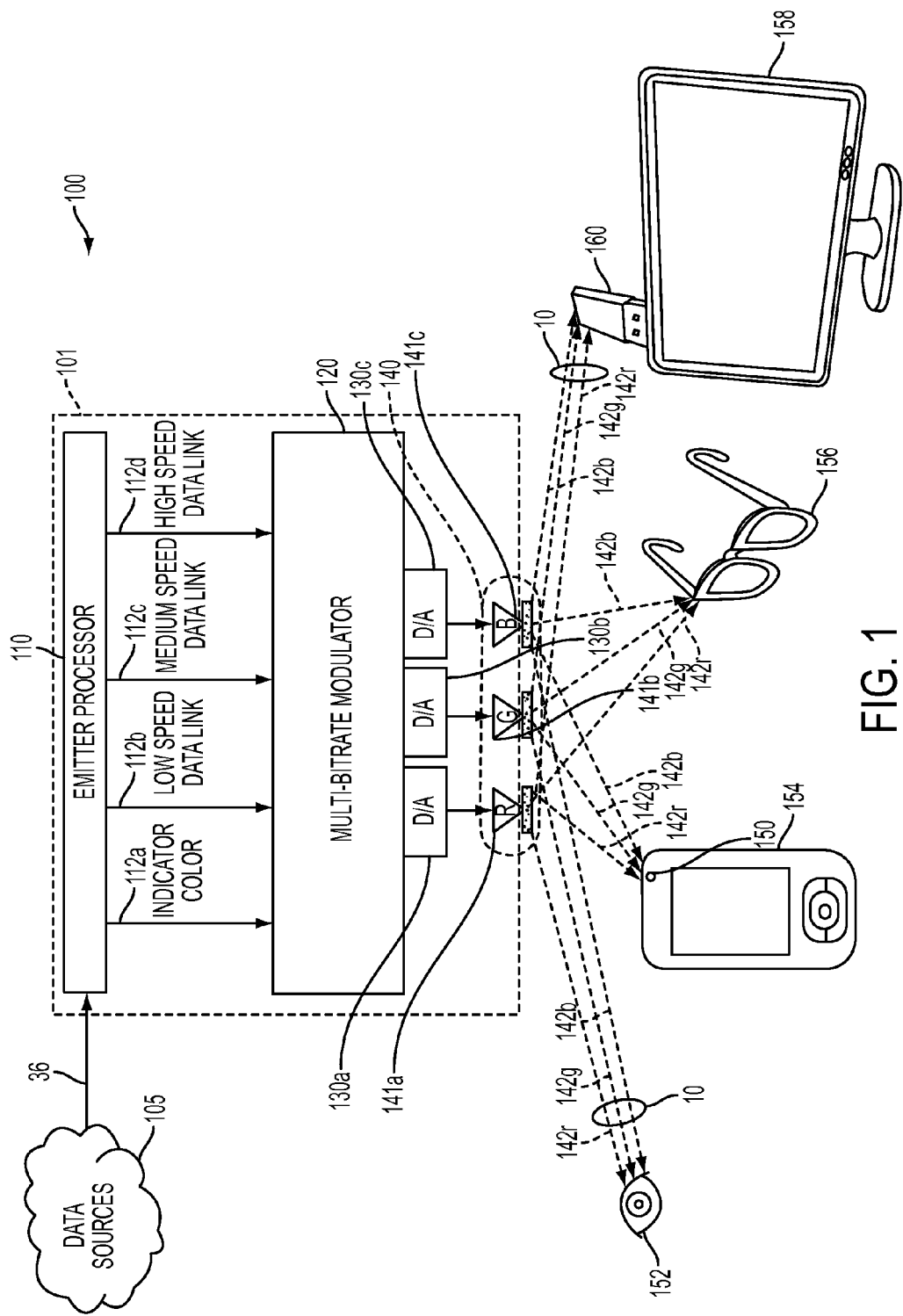
FIG. 1 illustrates an example emitter-based communications system comprising an example apparatus that can be configured to emit LED-based multi-bitrate data links that are multiplexed into a single modulated light beam, according to an example embodiment.

In one embodiment, a method comprises receiving, by an apparatus, first data at a first bitrate and second data at a second bitrate faster than the first bitrate; de-interleaving, by the apparatus, the first data into first de-interleaved data and the second data into second de-interleaved data; and controlling transmission of the first and second data in a single modulated light beam transmitted by a light emitting diode, the controlling including outputting portions of the first and second de-interleaved data to the light emitting diode, and controlling transmission of the light emitting diode.

In another embodiment, an apparatus comprises a communication interface circuit, and a processor circuit. The communication interface circuit is configured to receive first data at a first bitrate and second data at a second bitrate faster than the first bitrate. The processor circuit is configured to control de-interleaving of the first data into first de-interleaved data and the second data into second de-interleaved data, transmission of the first and second data in a single modulated light beam transmitted by a light emitting diode, and outputting respective portions of the first and second de-interleaved data to the light emitting diode, and to control transmission of the light emitting diode.

In another embodiment, logic is encoded in one or more non-transitory tangible media for execution by a machine, and when executed by the machine operable for: receiving, by an apparatus, first data at a first bitrate and second data at a second bitrate faster than the first bitrate; de-interleaving, by the apparatus, the first data into first de-interleaved data and the second data into second de-interleaved data; and controlling transmission of the first and second data in a single modulated light beam transmitted by a light emitting diode, the controlling including outputting portions of the first and second de-interleaved data to the light emitting diode, and controlling transmission of the light emitting diode.

In another embodiment, a method comprises receiving, by an apparatus, first and second data in a single modulated light beam; interleaving, by the apparatus, respective first portions of the first and second data, and respective second portions of the first and second data; and outputting, by the apparatus, the interleaved first portions of the first and second data at a first bitrate, and the interleaved second portions of the first and second data at a second bitrate faster than the first bitrate.

In another embodiment, an apparatus comprises a light sensor, and a processor circuit. The light sensor is configured to sense first and second data in a single modulated light beam. The processor circuit is configured to control interleaving, by the apparatus, respective first portions of the first and second data, and respective second portions of the first and second data, and outputting, by the apparatus, the interleaved first portions of the first and second data at a first bitrate, and the interleaved second portions of the first and second data at a second bitrate faster than the first bitrate.

In another embodiment, logic is encoded in one or more non-transitory tangible media for execution by a machine, and when executed by the machine operable for: receiving, by an apparatus, first and second data in a single modulated light beam; interleaving, by the apparatus, respective first portions of the first and second data, and respective second portions of the first and second data; and outputting, by the apparatus, the interleaved first portions of the first and second data at a first bitrate, and the interleaved second portions of the first and second data at a second bitrate faster than the first bitrate.

DETAILED DESCRIPTION

The proliferation of Internet of Everything (IoE) devices and/or Internet of Things (IoT) devices can require enhanced wireless connectivity. Many of these new IoE/IoT devices cannot be adequately served using traditional access network links, such as wired Ethernet, Fiber, Wi-Fi, 4G, and/or other Radio Frequency (RF) access technologies. Traditional data links have deficiencies, such as bit rate, radio frequency (RF) bandwidth, reach, interference immunity, power dissipation, transceiver cost, and/or privacy. Particular embodiments enable a multi-bitrate emitter comprised of a multi-color light emitting diode (LED) that can be configured to emit a plurality of LED-based multi-bitrate data links that are multiplexed into a single modulated light beam. A multi-bitrate modulator can be configured to drive the multi-color LED to produce the single modulated light beam transmitting the multiple multi-bitrate data links multiplexed into the single modulated light beam. The LED-based multi-bitrate data links can be configured to transmit various classes of information, ranging from status indication to ultra-high definition (UHD) video. The multi-bitrate emitter can be implemented in various devices for enabling network communications using a single modulated light beam. Example devices that can employ the multi-bitrate emitter for network communications using the single modulated light beam can include, for example, chargers, power strips, appliances, power tools, smoke alarms, networking equipment, communications equipment, vehicles, machines, telephones, instruments, TVs, monitors, smartphones, calculators, control buttons, medical devices, toys, status indicator bulbs, light fixtures, headlights, flashlights, etc.

The LED-based data links can be perceived by the human eye and/or detected by several classes of devices. The human eye can perceive the multi-color LED as an approximate steady designated color and/or a blinking light. The multi-bitrate modulator can be configured to control an average power supplied to the multi-color LED (e.g. individually for red/green/blue light emitting elements) to control the perceived designated color of and/or brightness emitted by the multi-color LED.

FIG. 1 illustrates an example emitter-based communications system 100 comprising an example apparatus 101 that can be configured to emit multi-bitrate LED-based data links 142r-g-b of different wavelengths that are multiplexed into a single modulated light beam 10, according to an example embodiment. The apparatus 101 is a physical machine (i.e., a hardware device) that can be configured to implement communications with other physical machines 105, 154, 156, 158, and/or 160, and/or a human eye 152, within the emitter system 100. The apparatus 101 is shown for simplicity as being in communication with a single smart phone 154, a single smart glasses 156, a single display 158 (e.g., computer monitor, television display, etc.) 158, and/or a single plug-in receiver 160. The apparatus 101 can be configured to communicate with any number of receiving devices, e.g., 154, 156, 158, 160. For example, the emitter system 100 can be deployed within a stadium and be configured to provide LED-based data links 142r-g-b to thousands of receiving devices.

The emitter system 100 can comprise data sources 105, a multi-bitrate emitter 101, and receiver devices that can include the smart phone 154, the smart glasses 156, and the display 158. The multi-bitrate emitter 101 can comprise an emitter processor 110, a multi-bitrate modulator 120, digital-to-analog converters 130a-c, and a multi-color LED 140. The multi-color LED 140 can be a red/green/blue (RGB) LED comprising a red light emitting element 141a, a green light emitting element 141b, and a blue light emitting element 141c. In some embodiments, the multi-bitrate emitter 101 can comprise a monochrome LED (a red LED, a green LED, or a blue LED) and emit a single multi-bitrate LED-based data link 142. In some embodiments, the multi-bitrate emitter 101 can comprise optics to direct the beams of light (e.g., the LED-based data links 142r-g-b) produced by the multi-color LED 140 to one or more receiving devices.

The multi-bitrate emitter 101 can be configured to control the multi-bitrate modulator 120 to execute protocol and modulation algorithms to control data patterns (e.g., 0s and/or 1s) emitted by the multi-color LED 140. The multi-bitrate modulator 120 can produce a modulation bitrate faster than approximately 20 Hz to make the LED-based data links 142r-g-b of the single modulated light beam 10 appear to the human eye 152 as being approximately steady in color and brightness based on indicator control data, while simultaneously embedding data from the emitter data links 112b-d onto the LED-based data links 142r-g-b that can be undetectable to the human eye 152.

The multi-bitrate emitter 101 can be configured to control the multi-bitrate modulator 120 to simultaneously and independently modulate one or more of the LED-based data links 142r-g-b at up to three distinct non-overlapping symbol rates. The multi-bitrate modulator 120 can be configured to produce data at one or more of the approximate 30-120 Hz symbol rate range, the approximate 30 kHz symbol rate, and the approximate 30 MHz symbol rate. The large separation of the symbol rates can ease detection of the different symbol rates at a receiving device and can enable individual one of the LED-based data links 142r-g-b of different bandwidths to individually serve different applications.

The multi-bitrate emitter 101 can be configured to control the multi-bitrate modulator 120 to simultaneously and independently modulate the LED-based data links 142r-g-b to create an aggregate bandwidth of approximately 90 b/s, or approximately 10 bytes/s in the approximate 30-120 Hz symbol rate range, taking into account transport overhead, concurrently with an aggregate bandwidth of approximately 90 kb/s, or approximately 10 kbytes/s at the approximate 30 kHz symbol rate, taking into account transport overhead, and also concurrently with an aggregate bandwidth of approximately 90 Mb/s at the approximate 30 MHz symbol rate, taking into account transport overhead.

The multi-bitrate emitter 101 can be configured to produce data in the approximate 30-120 Hz symbol rate range to convey such information as, e.g., channel selection, resolution, internal temperature, network status, serial number, software version, a URL for an advertised product, a link to a video service provider's website, text messages, etc. The multi-bitrate emitter 101 can be configured to produce data at the approximate 30 kHz symbol rate to convey such information as, e.g., program guides, manuals, web pages, etc. In some embodiments, the multi-bitrate emitter 101 can be configured to use the 30 kHz symbol rate to emit high quality streaming audio and/or low quality video (e.g., preview, Quarter Video Graphics Array (QVGA), etc.) The multi-bitrate modulator 120 can be configured to produce data at the approximate 30 MHz symbol rate to convey such information as, e.g., a single 4K Ultra High Definition (UHD) video, up to twelve HD videos, up to one hundred standard definition (SD) videos, and/or a combination thereof. In some embodiments, the multi-bitrate modulator 120 can be configured to emit LED-based data links 142r-g-b at 90 Mb/s to replace or supplement Wi-Fi for downloading of information.

The multi-bitrate emitter 101 can be configured to emit multiple language information and/or multiple audio streams to receiving devices. The multi-bitrate emitter 101 can be configured to emit different language information and/or audio from different video programs on each of the LED-based data links 142r-g-b. For example, a patron wearing the smart glasses 156 can visit an establishment with a video display comprising a multi-bitrate emitter 101 emitting a different language on each of the LED-based data links 142r-g-b. The smart glasses 156 can be configured to selectively receive a particular LED-based data link 142 from the available LED-based data links 142r-g-b, allowing the patron to select a desired audio language for the video program being watched. In some embodiments, the establishment can provide a plurality of video displays for patrons. The smart glasses 156 can be configured to selectively receive a particular LED-based data link 142 from the available LED-based data links 142 emitted by multiple multi-bitrate emitters 101 of the multiple video displays at the establishment, allowing the patron to select an audio stream that corresponds with the video being watched. In some embodiments, the smart glasses 156 can be configured to automatically switch between the available LED-based data links 142 emitted by multiple multi-bitrate emitters 101 when the patron points the smart glasses 156 toward a video display designated to emit a particular LED-based data link 142 for a particular language. In some embodiments, the smart glasses 156 can be configured to select a particular language transmitted with one or more LED-based data links 142 based on user preference settings.

Figure 2:
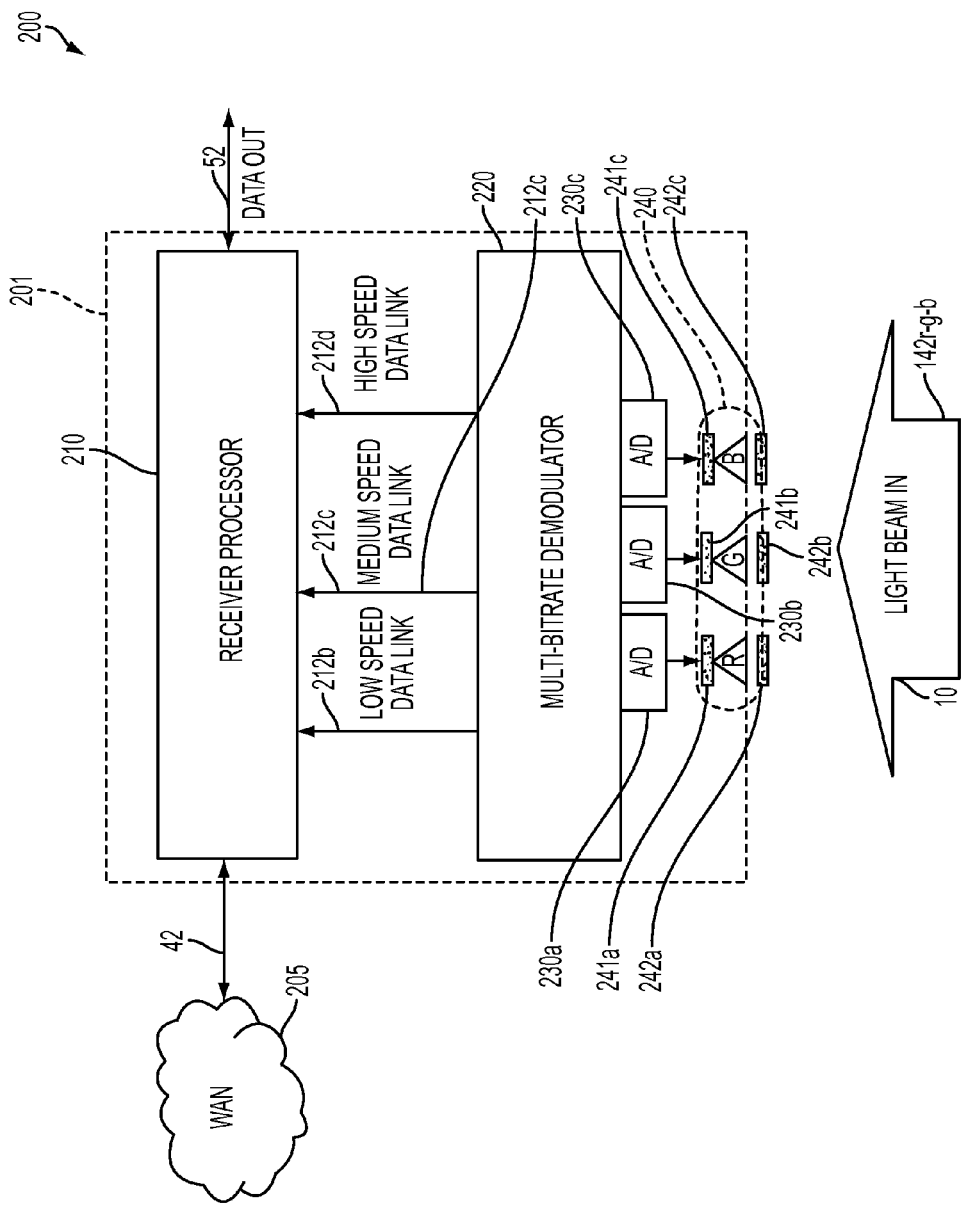
FIG. 2 illustrates an example receiver system comprising an example apparatus 201 that can be configured to receive the single modulated light beam comprising the LED-based multi-bitrate data links, according to an example embodiment.

FIG. 2 illustrates an example receiver system 200 comprising an example apparatus 201 that can be configured to receive the single modulated light beam 10 comprising the LED-based multi-bitrate data links 142r-g-b, according to an example embodiment. The apparatus 201 is a physical machine (i.e., a hardware device) that can be configured to implement communications with other physical machines, e.g., 154, 156, 158, 160, 205. The apparatus is shown for simplicity as being in communication a Wide Area Network (WAN) 205 and providing a single data out link 52. The apparatus 201 can be configured to communicate with any number of receiving devices (e.g., 154, 156, 158, 160) and provide a plurality of data out links 142.

The multi-bitrate receiver 201 can comprise a receiver processor 210, a multi-bitrate demodulator 220, analog-to-digital (A/D) converters 230a-c, and a light sensor array 240. The light sensor array 240 can comprise light sensing elements 241a-c and respective optical bandpass filters 242a-c.

The multi-bitrate receiver 201 can be configured to separate the multi-bitrate hierarchy of data on each of the LED-based data links 142r-g-b and combine data of common bitrates onto common data links. The multi-bitrate demodulator 220 can be configured to output data on receiver data links 212b-d that correspond in speed to the emitter data links 112b-d. The demodulator 220 can be configured for outputting "low" speed data on receiver data link 212b, "medium" speed data on receiver data link 212c, and "high" speed data on receiver data link 212d, the speed of the receiver data links 212b-d being relative to one another. For example, the demodulator 220 can be configured to output data at approximately 10 Bytes/second (B/s) onto the receiver data link 212b, 10 kB/s data onto the receiver data link 212c, and 10 Mega B/s data onto the receiver data link 212d. The multi-bitrate receiver 201 can reproduce the data produced by the emitter processor 110 of the multi-bitrate emitter 101 on emitter data links 112b-d, on receiver data links 212b-d of the multi-bitrate receiver 201.

Figure 6:
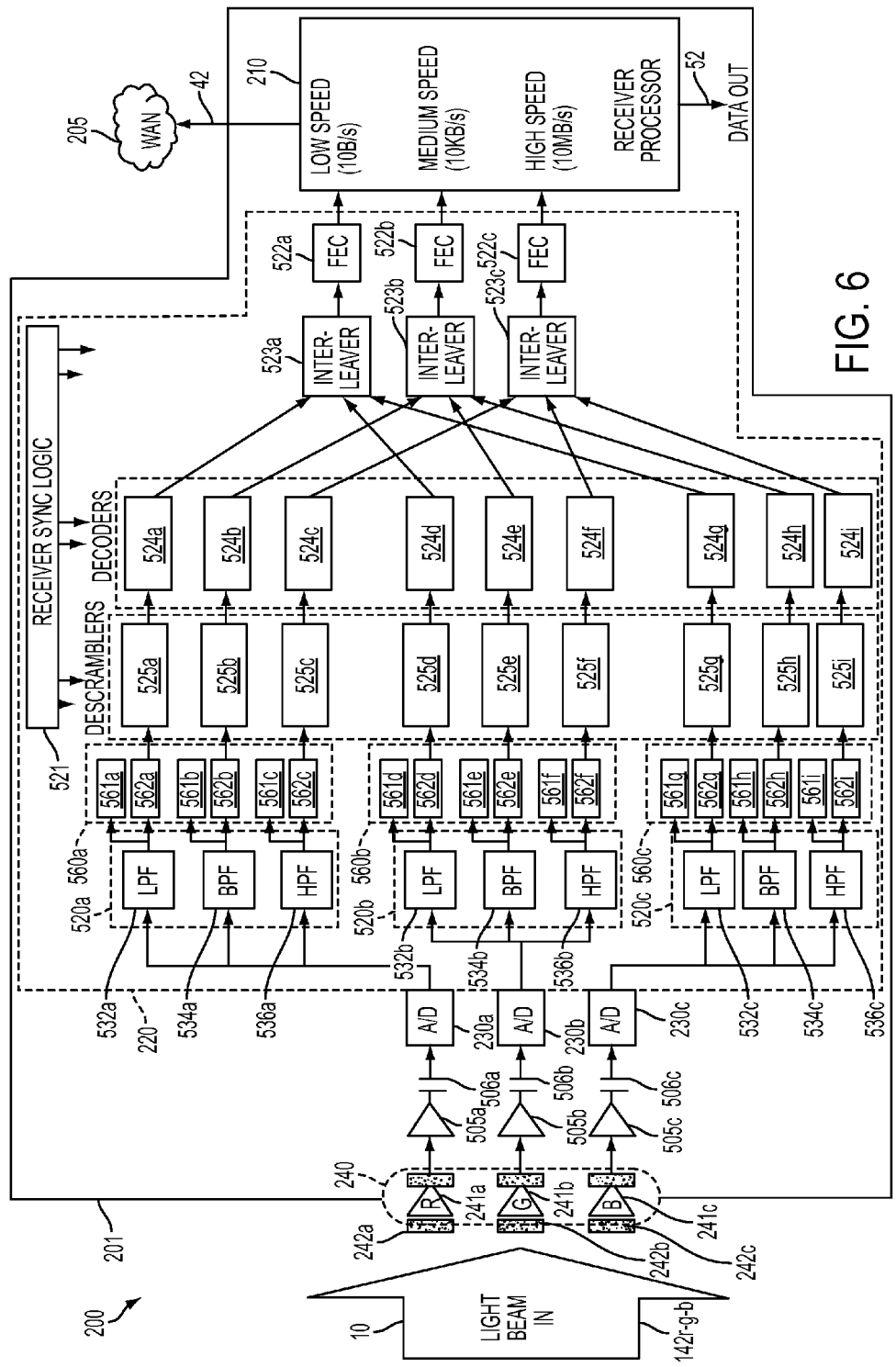
FIG. 6 illustrates in further detail the apparatus of FIG. 2, according to an example embodiment.

Each receiver device (e.g., the smartphone 154, the smart glasses 156, and the display 158 and/or receiver 160) can comprise the multi-bitrate receiver 201, shown in FIGS. 2 and 6. For example, camera 150 of the smartphone 154 can detect the LED-based multi-bitrate data links 142r-g-b output by the multi-color LED 140. The multi-bitrate receiver 201 can be configured to receive the approximately 30 Hz modulated signal produced by the multi-color LED 140, extract the signal modulated by the multi-bitrate emitter 101 from a sequence of frames, separate the modulated signal into three color channels, and demodulate the modulated information to recover data originally placed on one or more of the emitter data links 112b-d of the multi-bitrate emitter 101. The receiver 201 can be configured to receive the modulated signals produced by the multi-color LED 140 independent of any other data being received, e.g., from a cellular connection, a Wi-Fi connection, etc. The smartphone 154 can be configured to display, format, analyze, log and/or forward information demodulated from the LED-based data links 142r-g-b.

In some embodiments, the multi-bitrate receiver 201 can be implemented in the plug-in receiver 160, e.g., USB fob and/or Bluetooth fob. The multi-bitrate receiver 201 can be configured to receive data emitted by the multi-bitrate emitter 101 in any of the approximate 30-120 Hz symbol rate, the approximate 30 kHz symbol rate, and/or the approximate 30 MHz symbol rate, discussed above. In some embodiments, the glasses 156, display 158, and/or many other types of intelligent devices can comprise functionality of plug-in receiver 160.

Figure 3:
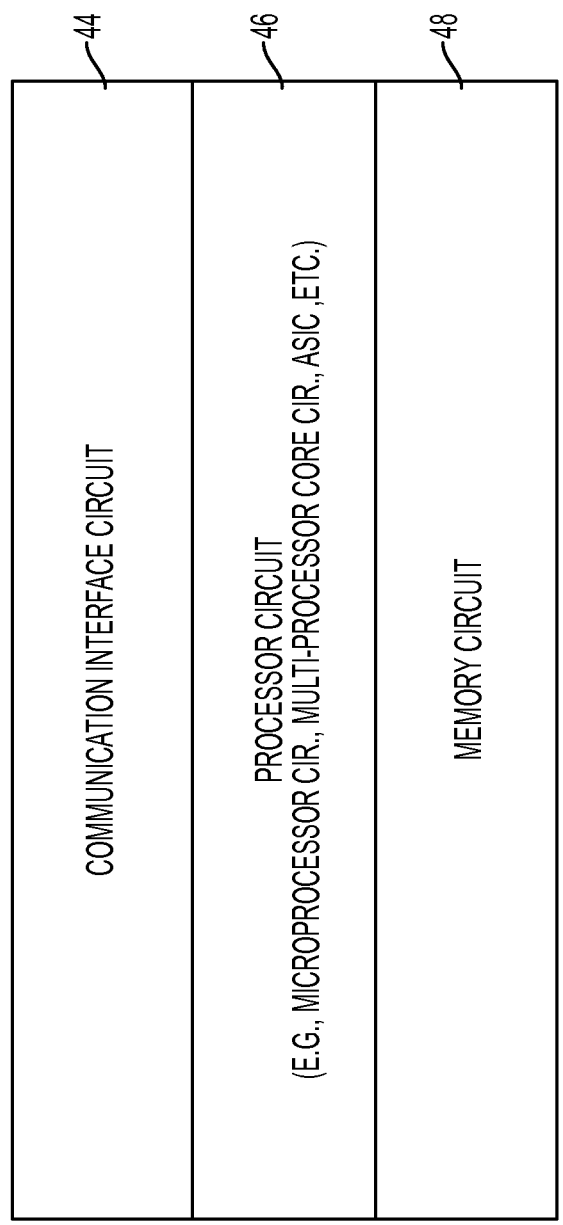
FIG. 3 illustrates an example implementation of the apparatus of FIGS. 1 and 2, according to an example embodiment.

FIG. 3 illustrates an example implementation of the apparatus of FIGS. 1 and 2, according to an example embodiment.

Each apparatus 101, 105, 154, 156, 158, 160, 201 and/or 205 can include a communication interface circuit 44, a processor circuit 46, and a memory circuit 48. The communication interface circuit 44 can include one or more distinct physical layer transceivers for communication with any one of the other devices 101, 105, 154, 156, 158, 160, 201 and/or 205; the communication interface circuit 44 also can include an IEEE based Ethernet transceiver for communications with the devices of FIG. 1 and FIG. 2 via any of the link layer data connections 36, 42, and 52 (e.g., a wired or wireless link, an optical link, etc.).

The processor circuit 46 can be configured for executing any of the operations described herein, and the memory circuit 48 can be configured for storing any data or data packets as described herein.

Any of the disclosed circuits of the devices 101, 105, 154, 156, 158, 160, 201 and/or 205 (including the communication interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit or Digital Signal Processor (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, disk (solid state or rotating), etc.

Figure 4:
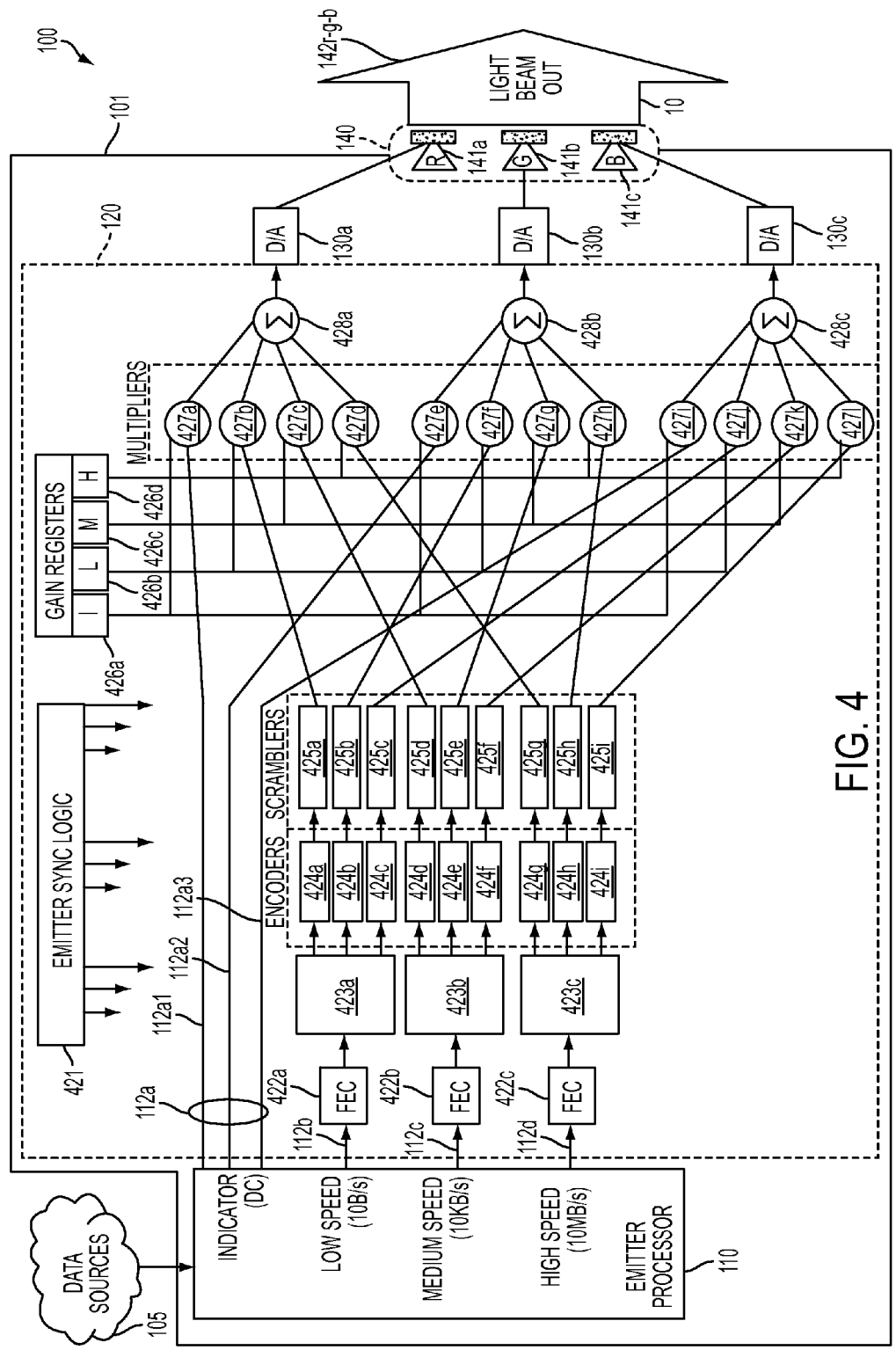
FIG. 4 illustrates in further detail the apparatus of FIG. 1, according to an example embodiment.

FIG. 4 illustrates in further detail the apparatus 101 of FIG. 1, according to an example embodiment. The multi-bitrate modulator 120 can comprise forward error correctors 422*a-c*, de-interleavers 423*a-c*, encoders 424*a-i*, scramblers 425*a-i*, gain registers 426*a-d*, multipliers 427*a-l*, and summation modules 428*a-c*.

Figure 5A:
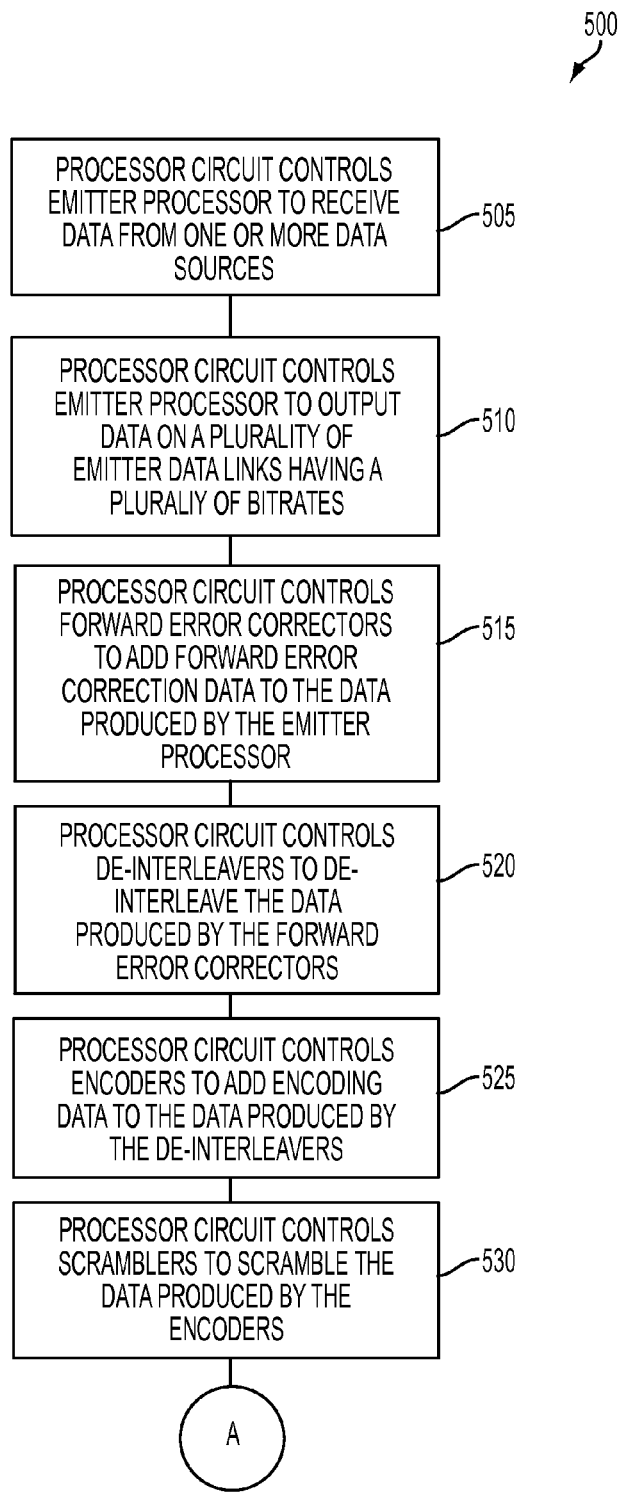
FIGS. 5A and 5B illustrate an example method executed by the multi-bitrate emitter, according to an example embodiment.
Figure 5B:
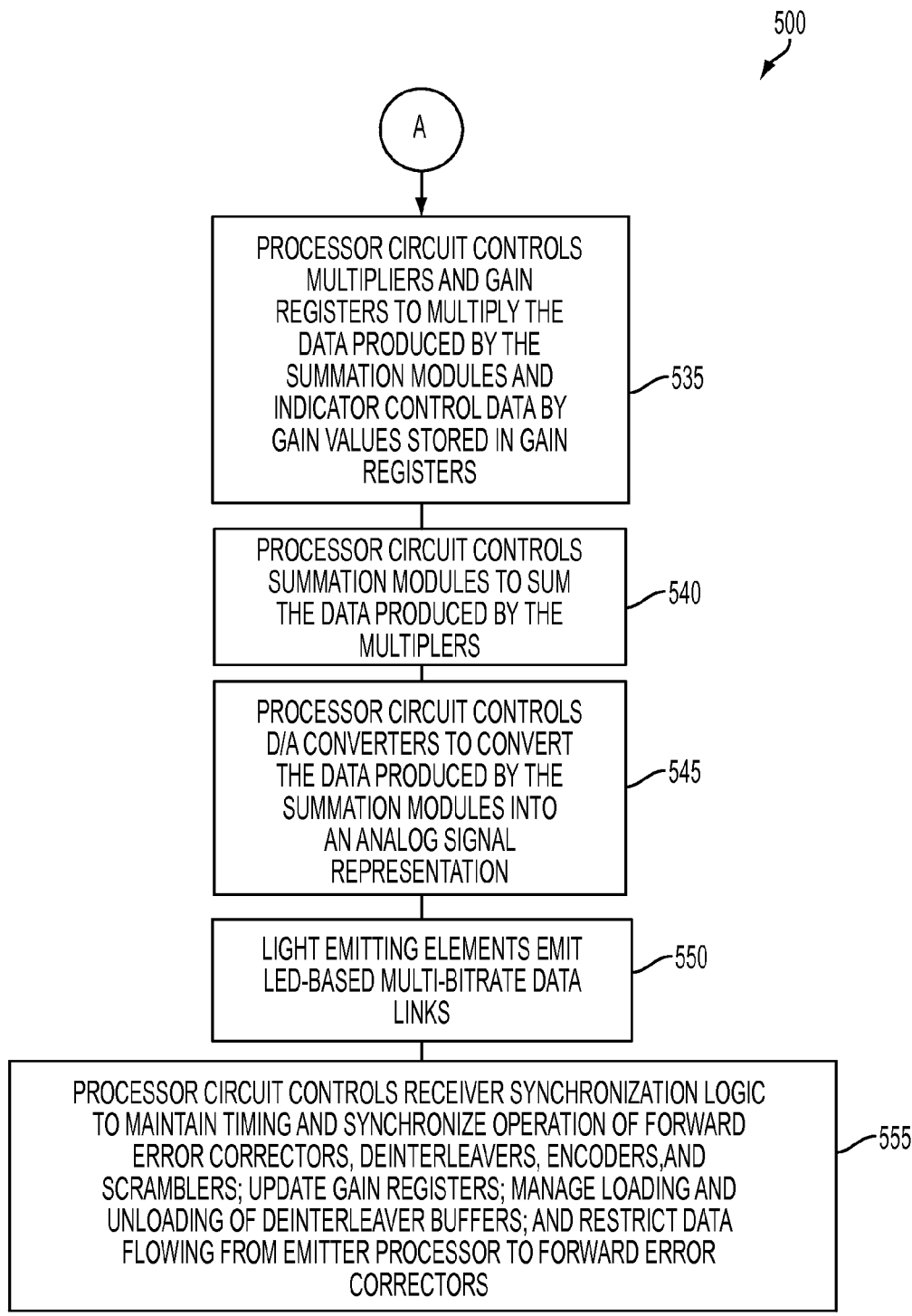

FIGS. 5A and 5B illustrate an example method 500 executed by the multi-bitrate emitter 101, according to an example embodiment. As described in combination with respect to FIGS. 1 and 4, the multi-bitrate emitter 101 (executed for example by processor circuit 46 of FIG. 3 and/or a logic circuit) can implement a method 500 to emit LED-based data links 142*r-g-b*, according to example embodiments.

The processor circuit 46 of the multi-bitrate emitter 101 can be configured to control the emitter processor 110 to receive in operation 505 data from one or more of the data sources 105 to be emitted by the multi-bitrate emitter 101 on the LED-based data links 142*r-g-b*. The data sources 105 can provide various types of information, e.g., text, audio, video, and/or any combinations of text, audio, and video. In some embodiments, each of the data sources 105 can be received by the multi-bitrate emitter 101 at a predesigned data rate.

The processor circuit 46 of the multi-bitrate emitter 101 can be configured to control the emitter processor 110 to output in operation 510 data on emitter data links 112*a-d*. The emitter processor 110 can output indicator control data on emitter data link 112*a*. The output control data can instruct the multi-bitrate modulator 120 to modulate data passing through the multi-bitrate modulator 120 to produce a desired perceived color of the multi-color LED 140. Emitter data link 112*b* can be configured as a "low" speed data link, emitter data link 112*c* can be configured as a "medium" speed data link, and emitter data link 112*d* can be configured as a "high" speed data link, the speed rating of the emitter data links 112*b-d* being relative to one another. For example, emitter data link 112*b* can transport data at approximately 10 Bytes/second (B/s), emitter data link 112*b* can transport data at approximately 10 kB/s, and emitter data link 112*c* can transport data at approximately 10 Mega B/s.

The emitter processor 110 can be configured to selectively output data on emitter data links 112*b-d* in various ways. The emitter processor 110 can be configured to analyze the data received in operation 505 to determine whether the data is to be output on a particular emitter data link 112. For example, the emitter processor 110 can analyze the data received from one or more of the data sources 105 to determine that the received data is text data and output the text data on emitter data link 112*b*, determine that the received data is audio data and output the audio data on emitter data link 112*c*, and determine that the received data is video data and output the video data on emitter data link 112*d*. In some embodiments, the determination could be made based upon the bitrate of the particular data stream, or capabilities of the multi-bitrate receiver 201 designated to receive the particular data stream.

In some embodiments, the data sources 105 can be configured to direct the data received by the emitter processor 110 onto a particular emitter data link 112. For example, one or more of the data sources 105 can be configured to add emission instruction data, e.g., to a data packet header, metadata, etc., to the data received by the emitter processor 110. The emitter processor 110 can be configured to analyze the emission instruction data and output the received data onto a particular emitter data link 112 according to the instructions given by the emission instruction data. For example, the emission instruction data can instruct the emitter processor 110 to output a first audio stream on emitter data link 112*c* and output a second audio stream on emitter data link 112*d*.

The processor circuit 46 of the of the multi-bitrate emitter 101 can be configured to control the forward error correctors 422*a-c* to add in operation 515 forward error correction data (e.g., Cross-interleaved Reed-Solomon encoding, Golay encoding, Bose Chaudhuri Hocquenghem (BCH) encoding, Multidimensional parity encoding, and/or Hamming encoding) to the data output by the emitter processor 110 onto the emitter data links 112*b-d*. The LED-based data links 142*r-g-b* can experience interference from, e.g., florescent light, movement of the multi-bitrate emitter 101 and/or the multi-bitrate receiver 201, and LED-based data links 142 from one or more other nearby multi-bitrate emitters 101. The forward error correction data can aid in the recovery of data if transmission errors occur. The forward error correctors 422*a-c* can add approximately 7.5% overhead to the data received over the emitter data links 112*b-d*. The amount of error correction provided by the forward error correctors 422*a-c* can be increased and/or decreased dependent upon performance goals for the LED-based data links 142*r-g-b*.

The processor circuit 46 of the multi-bitrate emitter 101 can be configured to control the de-interleavers 423*a-c* to split in operation 520 the forward error corrected data received produced by the forward error correctors 422*a-c*. Each of the de-interleavers 423*a-c* can be configured to perform a 1:3 de-interleave to split the forward error corrected data received produced by the forward error correctors 422*a-c* into three outputs. The de-interleavers 423*a-c* can be configured to perform de-leaving up to the bit level with each light emitting element 141 of the light emitting elements 141*a-c* transporting every third bit. The de-interleavers 423*a-c* also can de-interleave data in different sizes units, for example: at the byte level with bytes in data received from the data sources 105 being emitted by different light emitting elements 141*a-c* on a rotating basis; at the packet level with every third packet of data received from the data sources 105 being emitted by each of the light emitting elements 141*a-c*; at the packet level to evenly split data for transmission across the light emitting elements 141*a-c*; and/or split specific numbers of bytes for emission by each of the light emitting elements 141*a-c* with a receiving device configured to reassemble the split bytes, etc. In some embodiment, the multi-bitrate emitter 101 can be configured to use a different de-leave pattern for data on each of the emitter data links 112*b-d*. The de-interleavers 423*a-c* can comprise one or more buffers to smooth data flow through the de-interleavers 423*a-c*.

The processor circuit 46 of the multi-bitrate emitter 101 can be configured to control encoders 424*a-i* to encode in operation 525 data produced by the de-interleavers 423*a-c*. The encoders 424*a-i* can be configured to maintain a minimum transition density (e.g., transition between 0s and 1s, and 1s and 0s) to ensure the multi-bitrate emitter 101 can maintain clock lock with a receiving device. The encoders 424*a-i* can be configured to limit the number of consecutive 0s and/or 1s to less than 66 bits to maintain the minimum transition density. The encoders 424*a-i* can be configured to ensure DC level balance by ensuring an equal number of 1s and 0s averaged over multiple adjacent groups of 66 or 67 bits are emitted on respective light emitting elements 141*a-c*. The encoders 424*a-i* can be configured to ensure that a DC reference on a next lower speed channel is not significantly altered by the bit patterns in a faster signal carried on top of the next lower speed channel. For example, encoders 424*d-f* can be configured to ensure that the DC reference produced by encoders 424*a-c* is not altered. Likewise, encoders 424*g-i* can be configured to ensure that the DC reference produced by encoders 424*d-f* is not altered. The encoders 424*a-i* can be configured to use one or more of the Interlaken protocol 64b/66b and 64b/67b encoding schemes that provide DC current balancing while adding approximately 4.7% transport overhead.

The processor circuit 46 of the multi-bitrate emitter 101 can be configured to control the scramblers 425*a-i* to scramble in operation 530 data respectively produced by encoders 424*a-i*. The scramblers 425*a-i* can be configured to scramble the data produced by the encoders 424*a-i* using any of a variety of scrambling techniques, e.g., adaptive scrambling, multiplicative scrambling, etc.

The processor circuit 46 of the multi-bitrate emitter 101 can be configured to control the multipliers 427*a-l* to multiply in operation 535 the data produced by the scramblers 425*a-i* and indicator control data on emitter data link 112*a*, by gain multiplier values. The gain registers 426*a-d* can be configured to the store gain multiplier values that establish a proportion of power supplied to each of the light emitting elements 141*a-c*. Multiplier 427*a* can be configured to multiply indicator control data on emitter data link 112*a*1 (red component) by a gain multiplier value stored in gain register 426*a*, multiplier 427*e* can be configured to multiply indicator control data on emitter data link 112*a*2 (green component) by a gain multiplier value stored in gain register 426*a*, and multiplier 427*i* can be configured to multiply indicator control data on emitter data link 112*a*3 (blue component) by a gain multiplier value stored in gain register 426*a*. Multiplier 427*b* can be configured to multiply data produced by scrambler 425*a* by a gain multiplier value stored in gain register 426*b*, multiplier 427*c* can be configured to multiply data produced by scrambler 425*d* by a gain multiplier value stored in gain register 426*c*, multiplier 427*d* can be configured to multiply data produced by scrambler 425*g* by a gain multiplier value stored in gain register 426*d*, multiplier 427*f* can be configured to multiply data produced by scrambler 425*b* by a gain multiplier value stored in gain register 426*b*, multiplier 427*g* can be configured to multiply data produced by scrambler 425*e* by a gain multiplier value stored in gain register 426*c*, multiplier 427*h* can be configured to multiply data produced by scrambler 425*h* by a gain multiplier value stored in gain register 426*d*, multiplier 427*j* can be configured to multiply data produced by scrambler 425*c* by a gain multiplier value stored in gain register 426*b*, multiplier 427*k* can be configured to multiply data produced by scrambler 425*f* by a gain multiplier value stored in gain register 426*c*, and multiplier 427*l* can be configured to multiply data produced by scrambler 425*i* by a gain multiplier value stored in gain register 426*d*.

The processor circuit 46 of the multi-bitrate emitter 101 can be configured to control the gain registers 426*a-d* to store in operation 535 the gain multiplier values. The gain register 426*a* can store a gain multiplier value that is relatively high with respect to the gain multiplier values in stored in gain registers 426*b-d*. Gain register 426*a* can control a visual state (e.g., steady light, blinking) for the multi-color LED 140. The gain register 426*b* can store a gain multiplier value that is moderate with respect to the gain multiplier values stored in gain registers 426*c* and 426*d*. Gain register 426*b* can store a gain multiplier value that overcomes florescent lights that emit optical noise of similar frequencies as those produced by the multi-bitrate emitter 101. The gain registers 426*c* and 426*d* can store gain multiplier values that are relatively low with respect to the gain multiplier values stored in gain registers 426*a* and 426*b*. The gain multiplier values can be modified according to, e.g., ambient conditions, desired range of the LED-based data links 142*r-g-b*, a target bit error rate, power dissipation constraints for the multi-bitrate emitter 101, etc.

The processor circuit 46 of the multi-bitrate emitter 101 can be configured to control the summation modules 428*a-c* to sum in operation 540 the outputs of multipliers 427*a-l* to produce a binary value that represents an instantaneous brightness for light emitting elements 141*a-c*. Summation module 428*a* can be configured to sum the outputs of multipliers 427*a-d*, summation module 428*b* can be configured to sum the outputs of multipliers 427*e-h*, and summation module 428*c* can be configured to sum the outputs of multipliers 427*i-l*.

The processor circuit 46 of the multi-bitrate emitter 101 can be configured to control the D/A converters 130*a-c* to convert in operation 545 digital values respectively produced by the summation modules 428*a-c* into analog voltage or current signals. The D/A converters 130*a-c* can be connected to the light emitting elements 141*a-c*, respectively to control optical emitted power at particular wavelengths. The D/A converters 130*a-c* can comprise current drivers to drive light emitting elements 141*a-c* with the analog signals. The multi-color LED 140 comprising the light emitting elements 141*a-c* can produce a specific color and brightness according to the analog signals produced by the D/A converters 130*a-c*, and/or change the specific color and brightness in accordance with an approximate 30 ns timing associated with digital signal paths across the modulator 120.

The light emitting elements 141*a-c* of the multi-color LED 140 can be respectively configured to emit in operation 550 LED-based multi-bitrate data links 142*r-g-b* as a single modulated light beam 10. Each of the light emitting elements 141*a-c* can be configured to simultaneously emit in the approximate 30-120 Hz symbol rate range, at the approximate 30 kHz symbol rate, and at the approximate 30 MHz symbol rate at respective designated wavelengths.

The processor circuit 46 of the multi-bitrate emitter 101 can be configured to control the emitter synchronization logic 421 to maintain timing and synchronize in operation 555 of the operations of the forward error correctors 422*a-c*, de-interleavers 423*a-c*, encoders 424*a-i*, and scramblers 425*a-i* to ensure a DC current reference is maintained to control a color and brightness of the multi-color LED 140. The emitter synchronization logic 421 can be configured to update the gain multiplier values stored in gain registers 426*a-d*, execute a linear feedback shift register for scramblers 425*a-i*, control the encoders 424*a-i* to perform encoding (e.g., Interlaken protocol 64b/66b encoding and/or Interlaken protocol 64b/67b encoding), manage loading and unloading of the one or more buffers of the de-interleavers 423*a-c*, and restrict data flowing from the emitter processor 110 to the forward error correctors 422*a-c*.

For example, the processor circuit 46 of the multi-bitrate emitter 101 can be configured to control the multi-bitrate modulator 120 to control in operation 555 a color produced by the multi-color LED 140 to produce a red status indicator light to indicate, e.g., that a device incorporating the multi-bitrate emitter 101 is turned off. Likewise, the indicator control data can instruct the multi-bitrate modulator 120 to control the multi-color LED 140 to produce a green status indicator light to indicate, e.g., that a device incorporating the multi-bitrate emitter 101 is turned on. Other example status indications that can be produced by the multi-color LED 140 based on the indicator control data can be, e.g., a blinking red light to indicate an error condition, a blinking yellow light indicating a waiting message, a blinking green light indicating data access, a periodic blink indicating a status of a wireless connection, etc.

The processor circuit 46 of the multi-bitrate emitter 101 can be configured to control the emitter synchronization logic 421 to clock outputs in operation 555 of the scramblers 425a-i to ensure that bit transitions are properly aligned to ensure the slow speed channel, the medium speed channel, and the high speed channel share a common, precise timebase. The emitter synchronization logic 421 can be configured to ensure that the scramblers 425d-f of the medium speed channel operate 1000 (or 1024) times faster than the scramblers 425a-c of the low speed channel, and the scramblers 425g-i of the high speed channel operate 1000 (or 1024) times faster than the scramblers 425d-f of the medium speed channel. The emitter synchronization logic 421 can be configured to ensure that bit transitions of the multipliers 427a-l occur concurrently, and bit transitions of the summation modules 428a-c and latching of data into the D/A converters 130a-c occur concurrently.

The processor circuit 46 of the multi-bitrate emitter 101 can be configured to control the emitter synchronization logic 421 to dynamically adjust in operation 555 gain values stored in the gain registers 426a-d. The emitter synchronization logic 421 can be configured to increase gains for a channel temporarily before and/or after a bit transition of a next lower speed channel. The emitter synchronization logic 421 can be configured to monitor the forward error correctors 422a-c, de-interleavers 423a-c, and encoders 424a-i to anticipate a bit transition of a next lower speed channel and adjust the gain values stored in the gain registers 426b-d accordingly.

FIG. 6 illustrates in further detail the apparatus 201 of FIG. 2, according to an example embodiment. In particular, the multi-bitrate receiver 201 can comprise the amplifiers 505a-c and the capacitors 506a-c. The multi-bitrate demodulator 220 can comprise filter banks 520a-c, demodulator blocks 560a-c, descramblers 525a-i, decoders 524a-i, interleavers 523a-c, and error correctors 522a-c. The demodulator blocks 560a-c can comprise clock recovery modules 561a-i and decision modules 562a-i.

Figure 7A:
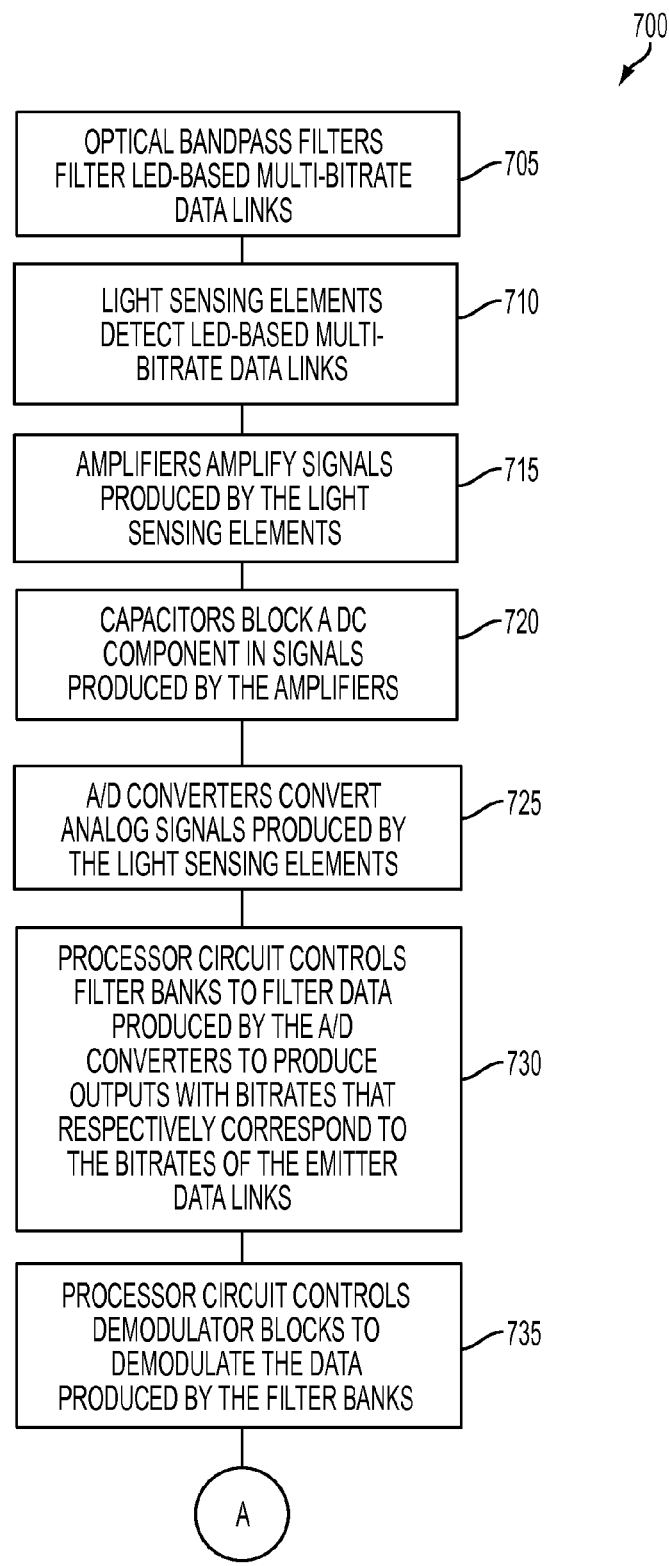
FIGS. 7A and 7B illustrate an example method executed by the multi-bitrate receiver, according to an example embodiment.
Figure 7B:
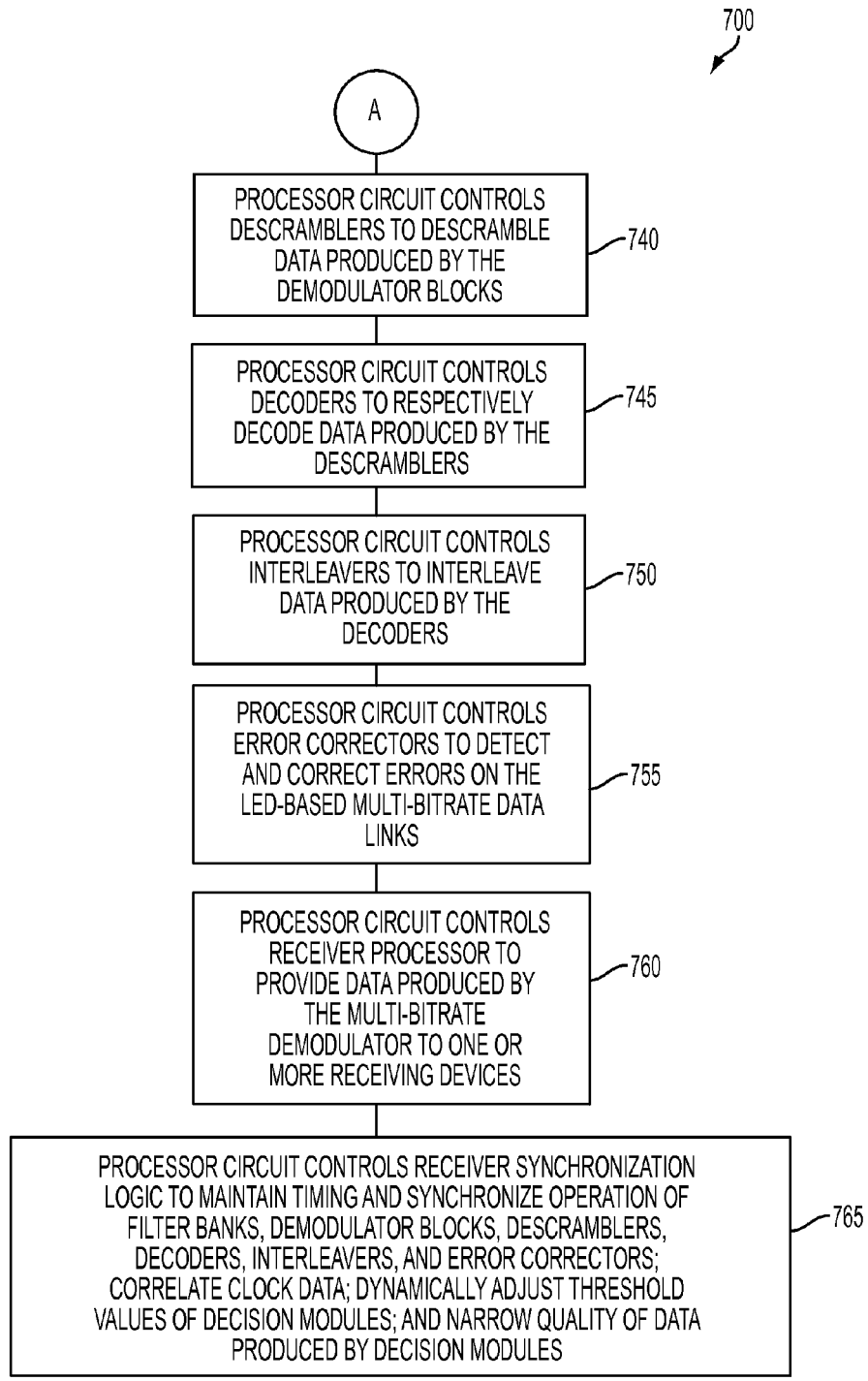

FIGS. 7A and 7B illustrate an example method 700 executed by the multi-bitrate receiver 201, according to an example embodiment. As described in combination with respect to FIGS. 2 and 6, the multi-bitrate receiver 201 can be executed for example by processor circuit 46 of FIG. 3 and/or a logic circuit.

The light sensor array 240 can be configured to filter in operation 705 the LED-based data links 142r-g-b emitted by the multi-bitrate emitter 101 shown in FIGS. 1 and 4. For example, optical bandpass filters 242a-c of the light sensor array 240 can match the light emitting elements 141a-c shown in FIGS. 1 and 4. Each optical bandpass filter 242a-c can be configured to permit one corresponding LED-based multi-bitrate data link 142r-g-b to reach a corresponding one of the light sensing elements 241a-c. For example, optical bandpass filter 242a can be configured to filter the wavelengths of LED-based multi-bitrate data links 142r-g-b to allow light of LED-based multi-bitrate data link 142r to pass to light sensing element 241a, optical bandpass filter 242b can be configured to filter the LED-based multi-bitrate data links 142r-g-b to allow light of LED-based multi-bitrate data link 142g to pass to light sensing element 241b, and optical bandpass filter 242c can filter the LED-based multi-bitrate data links 142r-g-b to allow light of LED-based multi-bitrate data link 142b to pass to light sensing element 241c.

The light sensing elements 241a-c of the multi-bitrate receiver 201 can be configured to detect in operation 710 the LED-based data links 142r-g-b, respectively. The light sensing element 241a of the light sensor array 240 can be configured to detect red light produced by the light emitting element 141a. The light sensing element 241b can be configured to detect green light produced by the light emitting element 141b. The light sensing element 241c can be configured to detect blue light produced by the light emitting element 141c. In some embodiments, the light sensor array 240 can comprise optics (e.g., lens, Galilean telescope, mirror, holographic optics, etc.) to concentrate and focus the LED-based data links 142r-g-b emitted by the multi-bitrate emitter 101 shown in FIGS. 1 and 4.

The amplifiers 505a-c (e.g., comprising an automatic gain control function) can be configured to amplify in operation 715 signals respectively produced by the light sensing elements 241a-c. Amplifier 505a can be configured to amplify signals produced by the light sensing element 241a, amplifier 505b can be configured to amplify signals produced by the light sensing element 241b, and amplifier 505c can be configured to amplify signals produced by the light sensing element 241c. In some embodiments, the amplifiers 505a-c can be configured to include impedance matching functions.

The capacitors 506a-c can be configured to block in operation 720 a DC component in the signal produced by the amplifiers 505a-c. The capacitors 506a-c can be configured to receive analog signals produced by the by the amplifiers 505a-c and block a DC component in the analog signal. Blocking the DC components can allow receiver 220 to reject any optical energy associated with the indicator channel 112a as well as any ambient or background light received by the multi-bitrate receiver 201.

The A/D converters 230a-c of the multi-bitrate receiver 201 can be configured to receive in operation 725 analog signals produced by the light sensing elements 241a-c and convert the received analog signals into a digital representation of the received analog signals. A/D converter 230a can be configured to convert the analog signals produced by light sensing element 241a, A/D converter 230b can be configured to convert the analog signals produced by light sensing element 241b, and A/D converter 230c can be configured to convert the analog signals produced by light sensing element 241c.

The processor circuit 46 of the multi-bitrate receiver 201 can be configured to control the filter banks 520a-c to filter in operation 730 the digital signals produced by the A/D converters 230a-c. The filter banks 520a-c each can be configured to respectively comprise low pass filters (LPFs) 532a-c, band pass filters (BPFs) 534a-c, and high pass filters (HPFs) 536a-c. Filter bank 520a can be configured to receive signals produced by A/D converter 230a, filter bank 520b can be configured to receive signals produced by A/D converter 230b, and filter bank 520c can be configured to receive signals produced by A/D converter 230c. The LPFs 532a-c can be configured to pass signals with frequencies below approximately 1 kHz. The BPFs 534a-c can be configured to pass signals with frequencies between approximately 1 kHz and 1 MHz. The HPFs 536*a-c* can be configured to pass signals with frequencies greater than approximately 1 MHz. The filter banks 520*a-c* can be configured to each produce three outputs that respectively correspond to the bitrate of the emitter data links 112*b-d*.

The processor circuit 46 of the multi-bitrate receiver 201 can be configured to control the demodulator blocks 560*a-c* to demodulate in operation 735 the data produced by the filter banks 520*a-c*. Each of the demodulator blocks 560*a-c* can comprise three clock recovery modules 561 and three corresponding decision modules 562. Clock recovery modules 561*a-i* can be configured to connect to decision modules 562*a-i*. The clock recovery modules 561*a-i* can be configured to extract a bit clock used to encode (e.g., Interlaken protocol 64b/66b and/or 64b/66b encoding) the LED-based data links 142*r-g-b*. Decision modules 562*a-i* can be configured to use the clock recovered by the clock recovery modules 561*a-i* to determine if the signals produced by the filter banks 520*a-c* represent digital 0s and/or 1s.

The processor circuit 46 of the multi-bitrate receiver 201 can be configured to control the descramblers 525*a-i* to descramble in operation 740 data respectively received produced by decision modules 562*a-i*. Descramblers 525*a-i* can be configured to descramble data to remove data scrambling added to LED-based data links 142*r-g-b* by scramblers 425*a-i*.

The processor circuit 46 of the multi-bitrate receiver 201 can be configured to control the decoders 524*a-i* to remove in operation 745 the 64b/67b encoding overhead added to the LED-based data links 142*r-g-b* by the encoders 424*a-i*. Decoders 524*a-i* can be configured to receive data respectively produced by descramblers 525*a-i* and check the data for consistency.

The processor circuit 46 of the multi-bitrate receiver 201 can be configured to control the interleavers 523*a-c* to combine in operation 750 data of a same bitrate. Interleaver 523*a* can be configured to receive and combine data produced by decoders 524*a*, 524*d*, and 524*g*, interleaver 523*b* can be configured to receive and combine data produced by decoders 524*b*, 524*e*, and 524*h*, and interleaver 523*c* can be configured to receive and combine data produced by decoders 524*c*, 524*f*, and 524*i*. The interleavers 523*a-c* can be configured to buffer the received data and reorder the received data. The interleavers 523*a-c* can be configured to detect the type of interleaving used by the de-leavers 423*a-c* in operation 520 and re-combine the data of a same bitrate accordingly.

The processor circuit 46 of the multi-bitrate receiver 201 can be configured to control the error correctors 522*a-c* to detect and correct in operation 755 transmission errors that can occur during modulation of the LED-based data links 142*r-g-b*, transportation of the LED-based data links 142*r-g-b*, and/or demodulation of the LED-based data links 142*r-g-b*. The error correctors 522*a-c* can be configured to detect the forward error correction data (e.g., Reed-Solomon) added to the LED-based data links 142*r-g-b* by the forward error correctors 422*a-c*, as discussed above. The error correctors 522*a-c* can be configured to output data that respectively corresponds to data on the emitter data links 112*b-d* (e.g., at approximately 10 B/s, approximately 10 kB/s, and approximately 10 MB/s).

The processor circuit 46 of the multi-bitrate receiver 201 can be configured to control the receiver processor 210 to provide in operation 760 the information produced by the multi-bitrate demodulator 220 to one or more devices. The receiver processor 210 can be configured to receive data over the receiver data links 212*b-d*. The receiver processor 210 can be configured to provide the data out link 52 to provide data received over the receiver data links 212*b-d* to one or more devices, e.g., the WAN 205, the smartphone 154, the smart glasses 156, the monitor 158, the plug-in receiver 160, etc.

The processor circuit 46 of the multi-bitrate receiver 201 can be configured to control the receiver synchronization logic 521 to maintain timing and synchronize in operation 765 of the operation of the filter banks 520*a-c*, demodulator blocks 560*a-c*, descramblers 525*a-i*, decoders 524*a-i*, interleavers 523*a-c*, and error correctors 522*a-c*. The receiver synchronization logic 521 can be configured to execute a linear feedback shift register for descramblers 525*a-i*, control decoders 524*a-i* to perform decoding, manage loading and unloading of one or more buffers of the interleavers 523*a-c*, and control data flow from the error correctors 522*a-c* to receiver processor 210. The receiver synchronization logic 521 can be configured to maintain precise merging of data as the data travels from the A/D converters 230*a-c* through the various digital processing elements of demodulator 220 to the receiver processor 210.

The processor circuit 46 of the multi-bitrate receiver 201 can be configured to control the receiver synchronization logic 521 to monitor and correlate in operation 765 clock data recovered by the clock recovery modules 561*a-i* for each of the three "speed" rated channels to produce a master clock for each channel. The receiver synchronization logic 521 can be configured to resolve any clock discrepancy for the three clocks recovered based on the fixed, known ratios between the data rates of the three channels. The receiver synchronization logic 521 can be configured to use a phase lock loop (PLL) to filter clock jitter. The receiver synchronization logic 521 can be configured to respectively drive the decision modules 562*a-i*, descramblers 525*a-i*, the decoders 524*a-i*, the interleavers 523*a-c*, and the error correctors 522*a-c* to provide data to the receiver processor 210, with the three recovered clocks.

The processor circuit 46 of the multi-bitrate receiver 201 can be configured to control the receiver synchronization logic 521 to dynamically adjust in operation 765 threshold values of the decision modules 562*a-i* for a given demodulator speed based on a bit transition that is occurring on a next lower speed channel. For example, the receiver synchronization logic 521 can be configured to detect a falling transition of a bit in the slow speed channel and adjust a threshold used by the medium speed channel from an S1 level to an S0 level (shown in FIG. 8).

The processor circuit 46 of the multi-bitrate receiver 201 can be configured to control the receiver synchronization logic 521 to improve in operation 765 the quality of data produced by the decision modules 562*a-i* and filter coefficients used in the filter banks 520*a-c*. The filter banks 520*a-c* can be implemented on a digital signal processor. The receiver synchronization logic 521 can be configured to adapt filter performance of the filter banks 520*a-c* to optimize the bit error rate produced by the decision modules 562*a-i* for changing optical characteristics of the LED-based data links 142*r-g-b*.

Figure 8:
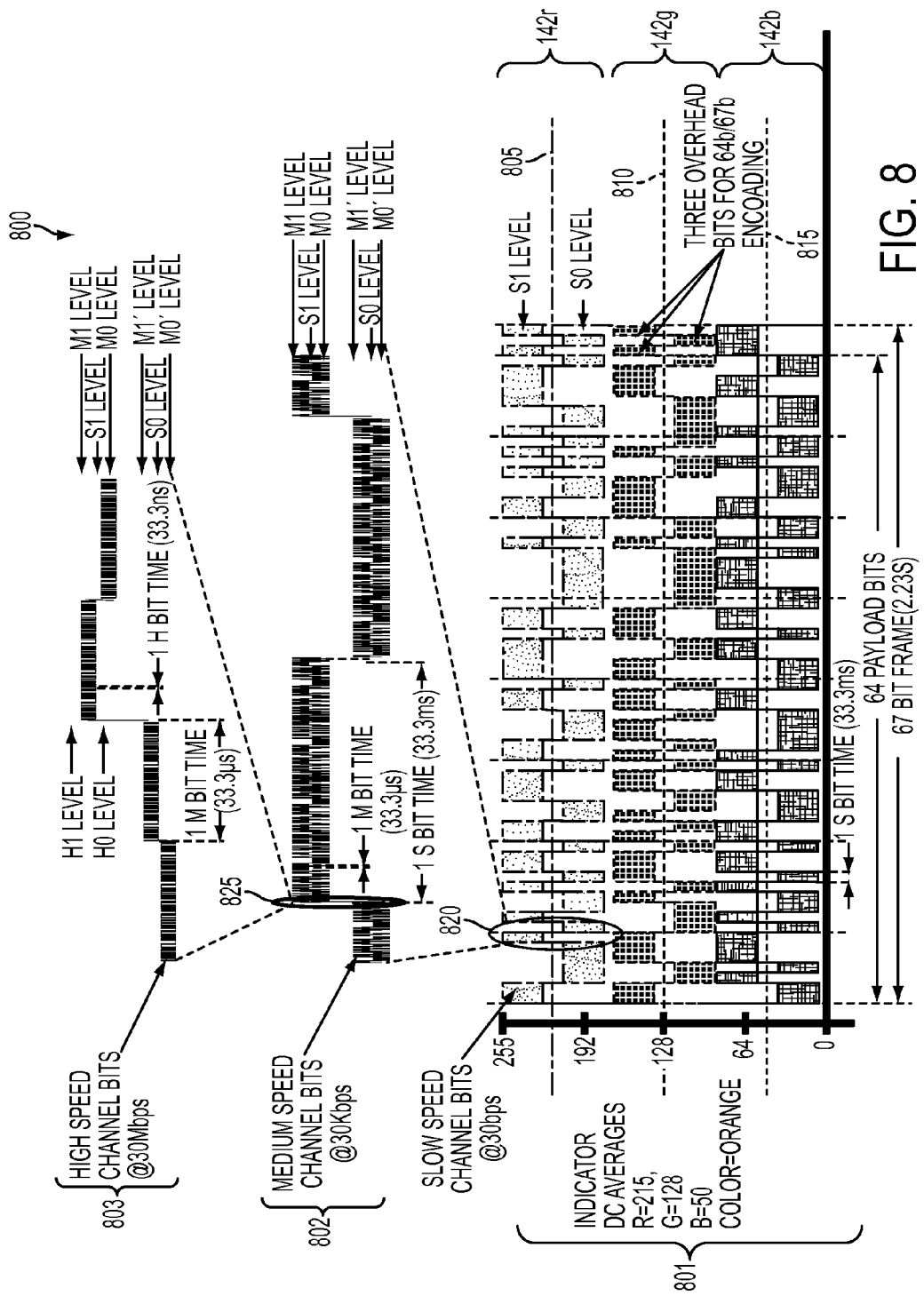
FIG. 8 illustrates a graphical representation of example data on LED-based data links shown in FIGS. 1, 2, 4 and 5, according to an example embodiment.

FIG. 8 illustrates a graphical representation 800 of example data on the LED-based data links 142*r-g-b* shown in FIGS. 1, 2, 4 and 5, according to an example embodiment.

The processor circuit 46 of the multi-bitrate emitter 101 can be configured to control the multi-bitrate modulator 120, in operations 515-540, to produce the bit patterns of an example single modulated light beam 10 shown in sections 801-803 of the graphical representation 800. Section 801 of the graphical representation 800 represents example bits of the example single modulated light beam 10 represented in the low speed channel, the medium speed channel, and the high speed channel. Although all three speed channels are represented in section 801 of the graphical representation 800, only the example bits of the low speed channel are shown in section 801 because the medium and high speeds channels existing within the smaller features of the low speed channel waveform. The bits of the medium speed channel and the high speed channel are broken out from payload section 820 of the low speed channel, and are shown in more detail in sections 802 and 803.

Section 801 of the example graphical representation 800 illustrates an example single modulated light beam 10. The example single modulated light beam 10 can represent analog waveforms measured at the outputs of D/A converters 130a-c in FIG. 4, input waveforms to amplifiers 505a-c in FIG. 6, or the light beam 10 as intercepted by the color filtered light sensor array 240, with the analog waveforms appropriately being amplified and displayed. The example single modulated light beam 10 is comprised of LED-based data links 142r-g-b. LED-based data link 142r can represent data produced by a red light emitting element 141a, LED-based data link 142g can represent data produced by a green light emitting element 141b, and LED-based data link 142b can represent data produced by a blue light emitting element 142b.

As discussed above, the LED-based data links 142r-g-b can be made to look to the human eye 152 as any color that is a combination of colors produced by the light emitting elements 141a-c. For the example graphical representation 800, the LED-based data links 142r-g-b can appear to the human eye 152 as an orange color. The LED-based data links 142r-g-b can produce an orange color with the light emitting elements 141a-c switching between two DC current values (S0 and S1), dimming and brightening the light emitting elements 141a-c and averaging to a DC current value. The red light emitting element 141a can be driven with a binary value of 215 shown as line 805, the green light emitting element 141b can be driven with a binary value of 128 shown as line 810, and the blue light emitting element 141c can be driven with a binary value of 50 shown as line 815. Individual bit transitions can be faster than the human eye 152 is able to perceive, and persistence of vision of the human eye 152 averages a complex signal out to perceive a desired color. The LED-based data links 142r-g-b can change in color, with the S0 and S1 levels adjusted up and/or down for all three colors accordingly. For example, the smartphone 154 can store executable application app software that can compensate for a DC current offset change that results in a color change, and can continue to decode a 30 bps LED-based data links 142r-g-b shown in section 801.

The example LED-based data links 142r-g-b can represent 64 payload bits of a 67 bit frame. The three furthest right bits at the end of the 67 bit frame can represent three overhead bit required for the Interlaken protocol 64b/66b and 64b/67b encoding schemes. A single bit transitions in the low speed channel can occur within 33.3 ms.

Section 802 of the graphical representation 800 illustrates bits produced in the medium speed channel and the high speed channel. Although two speed channels are represented in section 802, only the example bits of the medium speed channel are shown in section 802 because the high speed channel exists within the smaller features of the medium speed channel waveform. The bits of the high speed channel are broken out from payload section 825 of the medium speed channel and shown in more detail in section 803.

Section 802 illustrates a single bit transition can occur in the medium speed channel in approximately 33.3 μs. The light emitting element 141a can be driven with DC current values M1 and M0, and M1' and M0' to create the example bits shown in section 802. S1 level is shown as the average DC current level between M1 and M0, and S0 level is shown as the average DC current level between M1' and M0'.

Section 803 of the graphical representation 800 illustrates bits represented in the high speed channel. Section 803 illustrates a single bit transition can occur in payload section 825 of the medium speed channel in approximately 33.3 ns. The light emitting elements 141a-c can be driven with DC values M1 and M0, and M1' and M0' to create the example bits shown in section 803. S1 level is shown as the average DC level between M1 and M0, and S0 level is shown as the average DC level between M1' and M0'. The light emitting elements 141a-c can be driven with approximate DC current values H1 and H0, the average of H1 and H0 over a span of approximately 1000 H0/H1 transitions occurring during a medium speed channel bit interval.

The LED-based data links 142r-g-b can be modulated to create a designated color by averaging the S0 and S1 values, averaging the M0 and M1 values of the slow speed channel, and averaging the H0 and H1 values of the medium speed channel. A receiving device for the low speed channel, e.g., a smartphone 150, can be configured to ignore the indicator color using a DC restoration algorithm and the DC blocking capacitors 506a-c, and ignore the medium speed channel and the high speed channel by integrating them out. A receiving device for the low speed channel can average a received waveform across a period of time that is shorter than the low speed channel bit time, but much longer than the medium and high speed channel bit times. A medium speed channel receiver, e.g., smart glasses 156, can be configured to ignore the indicator color and low speed channel via DC restoration, and ignore the high speed channel via integration. A high speed receiving device, e.g., plug-in receiver 160, can be configured to ignore the indicator color, the low speed channel, and the medium speed channel by tracking transitions that look like DC level shifts occurring approximately 1000 bit times in the multi-bitrate demodulator 220. The high speed receive device can be configured to only detect LED-based data links 142r-g-b having data transmitted at 30 Mbps on each of three color channels.

In some embodiments, a single device can be configured to comprise both the multi-bitrate emitter 101 and the multi-bitrate receiver 201. Such a device can be configured to use bidirectional LED-based data links 142r-g-b.

Various devices can comprise the multi-bitrate emitter 101 and the multi-bitrate receiver 201. For example, an LED flashlight can comprise the multi-bitrate emitter 101 to implement a "fuel gauge" by modulating its output lamp with a coded message detailing a charge state of the batteries of the LED flashlight. Wall-mounted power adapters can comprise the multi-bitrate emitter 101 to modulate a pilot light to provide information about the energy use of wall-mounted power adapters. LCD displays, coffee pots, fans, toasters, power tools, etc. can comprise the multi-bitrate emitter 101 to provide status information, which can be received on various devices 154, 156, 158, 160.

Active-matrix organic light-emitting diode (AMOLED) displays can comprise the multi-bitrate emitter 101. Each pixel of the AMOLED display can be individually controlled with the multi-bitrate emitter 101 to form large arrays of visible light emitters for each color.

Devices, that already have an Internet connection via traditional wired or wireless networks, can comprise the multi-bitrate emitter 101 to, e.g., to offload congested Wi-Fi networks, transmit information to apps, transmit alternate audio channels, etc. The multi-bitrate emitter 101 can be configured to transmit commercial information, purchasing information for furniture and/or garments shown on a television program, etc. In venues with multiple video displays showing multiple different programs, e.g., sports bars, the multi-bitrate emitter 101 can be configured to provide sync information to sync a sound source and video being displayed on a screen, e.g., a stadium screen, with the sound being obtained via Wi-Fi and/or FM.

Any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electromagnetic field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical, optical, or radio frequency transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

The operations described in any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method, comprising:

receiving, by an apparatus, first data at a first bitrate and second data at a second bitrate faster than the first bitrate;

de-interleaving, by the apparatus, the first data into first de-interleaved data split into first and second portions thereof for supply of the corresponding first and second portions to respective first and second color channels, and de-interleaving the second data into second de-interleaved data split into first and second portions thereof for supply of the corresponding first and second portions to the first and second color channels, respectively; and controlling wireless transmission of the first and second data in a single modulated light beam transmitted by a multi-color light emitting diode (LED) configured for outputting first and second LED-based data links on the respective first and second color channels in the single modulated light beam, the controlling including:

outputting the first portions of the first and second de-interleaved data to the multi-color LED for transmission on the first data link of the first color channel, outputting the second portions of the first and second de-interleaved data to the multi-color LED for transmission on the second data link of the second color channel, and controlling transmission of the first and second data links, on the respective first and second color channels, by the multi-color LED within the single modulated light beam.

2. The method of claim 1, further comprising adding, by the apparatus, one or more of Cross-interleaved Reed-Solomon encoding, Golay encoding, Bose Chaudhuri Hocquenghem (BCH) encoding, Multidimensional parity encoding, or Hamming encoding data to the first and the second data.

3. The method of claim 1, wherein the de-interleaving is performed at one or more of a bit level, byte level, packet level, and splitting specific number of bytes for transmission by the light emitting diode.

4. The method of claim 1, wherein:

the first de-interleaved data and the second de-interleaved data each are further split to include a corresponding third portion for supply to a third color channel output by the multi-color LED in the single modulated light beam;

the controlling further includes outputting the third portions of the first and second de-interleaved data to the multi-color LED for transmission on a third LED-based data link on the third color channel;

the controlling further includes controlling transmission of the third data link, on the third color channel, by the multi-color LED within the single modulated light beam.

5. The method of claim 4, further comprising:

receiving, by the apparatus, third data at a third bitrate faster than the first bitrate and the second bitrate;

de-interleaving, by the apparatus, the third data into third de-interleaved data split into first, second, and third portions thereof for supply of the corresponding first, second, and third portions to the first, second, and third color channels, respectively; and controlling transmission of the third data in the single modulated light beam, the controlling including outputting the first, second, and third portions of the third de-interleaved data to the multi-color LED for transmission on the first, second, and third data links of the first, second, and third color channels, respectively.

6. An apparatus, comprising:
a communication interface circuit configured to receive first data at a first bitrate and second data at a second bitrate faster than the first bitrate; and
a processor circuit configured to control wireless transmission of the first and second data in a single modulated light beam by a multi-color light emitting diode (LED) configured for outputting first and second LED-based data links on respective first and second color channels in the single modulated light beam, the processor circuit further configured for:
de-interleaving the first data into first de-interleaved data split into first and second portions thereof for supply of the corresponding first and second portions to the respective first and second color channels, and de-interleaving the second data into second de-interleaved data split into first and second portions thereof for supply of the corresponding first and second portions to the first and second color channels, respectively,
outputting the first portions of the first and second de-interleaved data on a first output to the multi-color LED for transmission on the first data link of the first color channel,
outputting the second portions of the first and second de-interleaved data on a second output to the multi-color LED for transmission on the second data link of the second color channel, and
controlling transmission of the first and second data links, on the respective first and second color channels, by the multi-color LED within the single modulated light beam.

7. The apparatus according to claim 6, wherein the processor circuit is further configured to control adding one or more of Cross-interleaved Reed-Solomon encoding, Golay encoding, Bose Chaudhuri Hocquenghem (BCH) encoding, Multidimensional parity encoding, and Hamming encoding data to the first and the second data.

8. The apparatus according to claim 6, wherein the de-interleaving is performed at one or more of a bit level, byte level, packet level, and splitting specific number of bytes for transmission by the light emitting diode.

9. The apparatus of claim 6, wherein:
the processor circuit is further configured for causing the first de-interleaved data and the second de-interleaved data each to be further split to include a corresponding third portion for supply to a third color channel output by the multi-color LED in the single modulated light beam;
the processor circuit further configured for causing outputting of the third portions of the first and second de-interleaved data on a third output to the multi-color LED for transmission on a third LED-based data link on the third color channel;
the processor circuit further configured for controlling transmission of the third data link, on the third color channel, by the multi-color LED within the single modulated light beam.

10. The apparatus according to claim 9, wherein:
the communication interface circuit is further configured to receive third data at a third bitrate faster than the first bitrate and the second bitrate; and the processor circuit is further configured to control de-interleaving of the third data into third de-interleaved data split into first, second, and third portions thereof for supply of the corresponding first, second, and third portions to the first, second, and third color channels, respectively, and
the processor circuit further configured for outputting the first, second, and third portions of the third de-interleaved data, via the respective first, second, and third outputs, to the multi-color LED for transmission on the first, second, and third data links of the first, second, and third color channels, respectively.

11. One or more non-transitory machine-readable tangible media encoded with logic for execution by a machine and when executed by the machine operable for:
receiving, by the machine implemented as an apparatus, first data at a first bitrate and second data at a second bitrate faster than the first bitrate;
de-interleaving, by the apparatus, the first data into first de-interleaved data split into first and second portions thereof for supply of the corresponding first and second portions to respective first and second color channels, and de-interleaving the second data into second de-interleaved data split into first and second portions thereof for supply of the corresponding first and second portions to the first and second color channels, respectively; and
controlling wireless transmission of the first and second data in a single modulated light beam transmitted by a multi-color light emitting diode (LED) configured for outputting first and second LED-based data links on the respective first and second color channels in the single modulated light beam, the controlling including:
outputting the first portions of the first and second de-interleaved data to the multi-color LED for transmission on the first data link of the first color channel,
outputting the second portions of the first and second de-interleaved data to the multi-color LED for transmission on the second data link of the second color channel, and
controlling transmission of the first and second data links, on the respective first and second color channels, by the multi-color LED within the single modulated light beam.

12. A method, comprising:
receiving, by an apparatus, a single wireless modulated light beam comprising first and second color channels providing respective first and second light emitting diode (LED)-based data links;
obtaining, by the apparatus, first data from the first data link of the first color channel and second data from the second data link of the second color channel;
obtaining, by the apparatus, first portions from each of the first and second data, the first portions associated with a first bitrate;
obtaining, by the apparatus, second portions from each of the first and second data, the second portions associated with a second bitrate different than the first bitrate;
interleaving, by the apparatus, the first portions of the first and second data for generation of a first data stream at the first bitrate, and the second portions of the first and second data for generation of a second data stream at the second bitrate; and
outputting, by the apparatus, at least one of the first or second data streams at the corresponding first or second bitrate.

13. The method of claim 12, wherein the single modulated light beam further comprises a third color channel providing a third LED-based data link, the method further comprising:
- obtaining, by the apparatus, third data from the third data link of the third color channel in the single modulated light beam; and
- obtaining, from the third data, the corresponding first and second portions associated with the first and second bitrates, respectively;
- the interleaving comprising interleaving, by the apparatus, at least the first portion of the third data with the first portions of the first and second data for generation of the first data stream, or interleaving the second portion of the third data with the second portions of the first and second data for generation of the second data stream.

14. The method of claim 12, further comprising selecting one of the first data or the second data based on a user preference.

15. The method of claim 12, further comprising removing error from the first and second data with one or more of Cross-interleaved Reed-Solomon decoding, Golay decoding, Bose Chaudhuri Hocquenghem (BCH) decoding, Multidimensional parity decoding, or Hamming decoding.

16. The method of claim 12, wherein the interleaving is performed at one or more of a bit level, byte level, packet level, and combing specific number of bytes.

17. An apparatus, comprising:
- a light sensor array configured to sense, in a single wireless modulated light beam, first and second color channels providing respective first and second light emitting diode (LED)-based data links, the light sensor array further configured for obtaining first data from the first data link of the first color channel and second data from the second data link of the second color channel; and
- a processor circuit configured to control interleaving for generation of at least one of a first data stream at a first bitrate or a second data stream at a second bitrate, the processor circuit further configured for:
- obtaining first portions from each of the first and second data, the first portions associated with a first bit rate,
- obtaining second portions from each of the first and second data, the second portions associated with a second bitrate different than the first bitrate,
- causing interleaving of the first portions of the first and second data for generation of the first data stream at the first bitrate, and causing interleaving of the second portions of the first and second data for generation of the second data stream at the second bitrate, and
- outputting at least one of the first or second data streams at the corresponding first or second bitrate.

18. The apparatus of claim 17, wherein:
- the single modulated light beam further comprises a third color channel providing a third LED-based data link;
- the light sensor array is further configured to obtain third data from the third data link of the third color channel in the single modulated light beam; and
- the processor circuit is further configured for:
- obtaining, from the third data, the corresponding first and second portions associated with the first and second bitrates, respectively,
- interleaving at least one of the first portion of the third data with the first portions of the first and second data for generation of the first data stream, or interleaving the second portion of the third data with the second portions of the first and second data for generation of the second data stream.

19. The apparatus of claim 17, wherein the processor is further configured to select one of the first or second data based on a user preference.

20. The apparatus of claim 17, further comprising:
- error correctors configured to use one or more of Cross-interleaved Reed-Solomon decoding, Golay decoding, Bose Chaudhuri Hocquenghem (BCH) decoding, Multidimensional parity decoding, or Hamming decoding to remove error from the first and second data.

21. The apparatus of claim 17, wherein the interleaving is performed at one or more of a bit level, byte level, packet level, and combing specific number of bytes.

22. One or more non-transitory machine-readable tangible media encoded with logic for execution by a machine and when executed by the machine operable for:
- receiving, by the machine implemented as an apparatus, a single wireless modulated light beam comprising first and second color channels providing respective first and second light emitting diode (LED)-based data links;
- obtaining, by the apparatus, first data from the first data link of the first color channel and second data from the second data link of the second color channel;
- obtaining, by the apparatus, first portions from each of the first and second data, the first portions associated with a first bitrate;
- obtaining, by the apparatus, second portions from each of the first and second data, the second portions associated with a second bitrate different than the first bitrate;
- interleaving, by the apparatus, the first portions of the first and second data for generation of a first data stream at the first bitrate, and the second portions of the first and second data for generation of a second data stream at the second bitrate; and
- outputting, by the apparatus, at least one of the first or second data streams at the corresponding first or second bitrate.

* * * * *